March 17, 1970  J. HALL  3,500,612
SLIDE TRAY LOADER

Filed Jan. 22, 1968  5 Sheets-Sheet 1

JUSTICE HALL
INVENTOR

BY Allan M. Shapiro

ATTORNEY

March 17, 1970   J. HALL   3,500,612
SLIDE TRAY LOADER
Filed Jan. 22, 1968   5 Sheets-Sheet 2

JUSTICE HALL
INVENTOR
BY Allen M. Shapiro
ATTORNEY

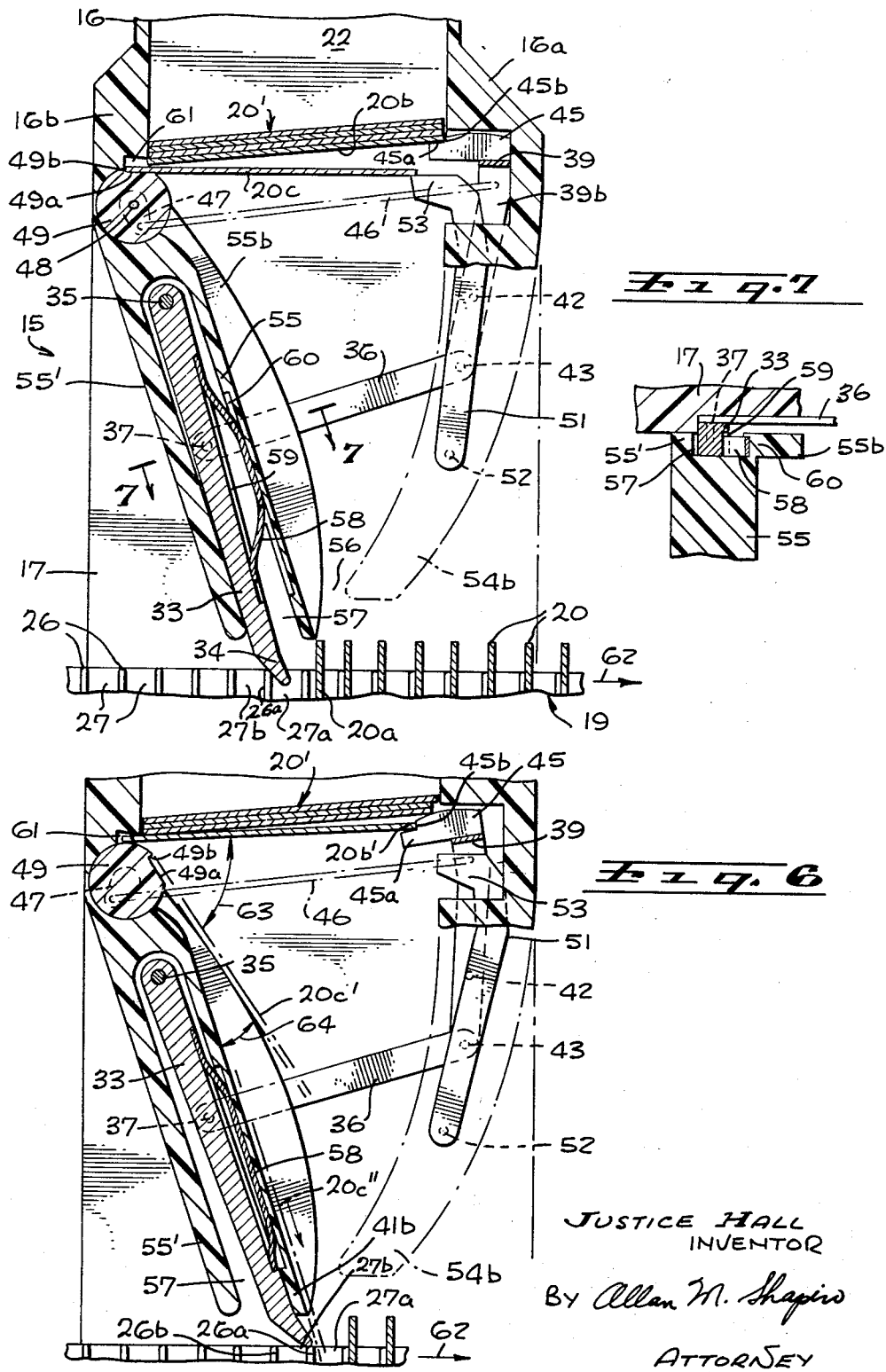

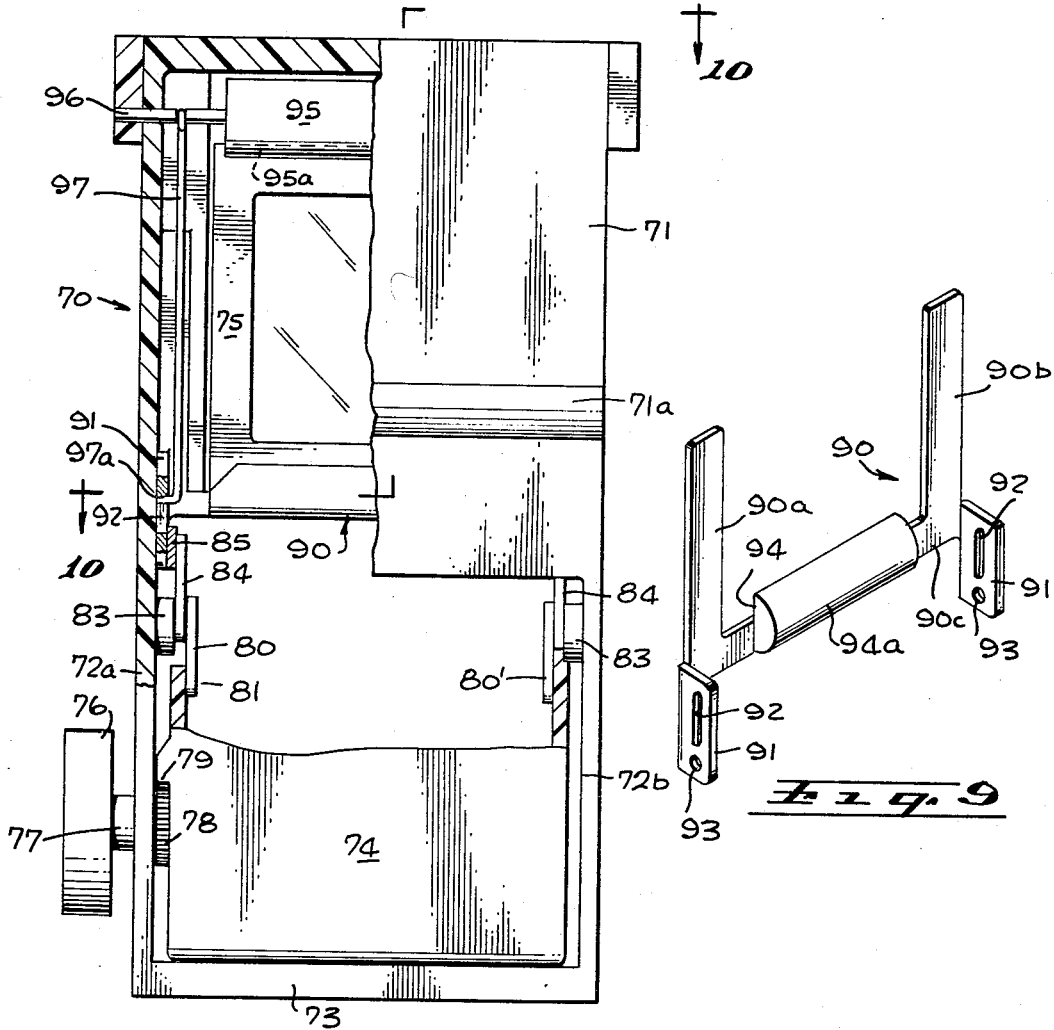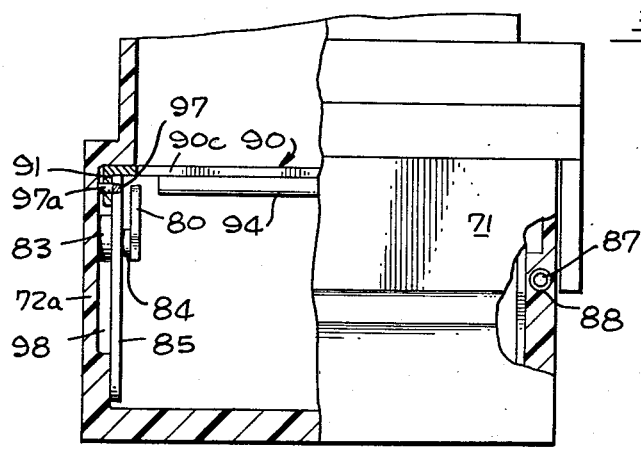

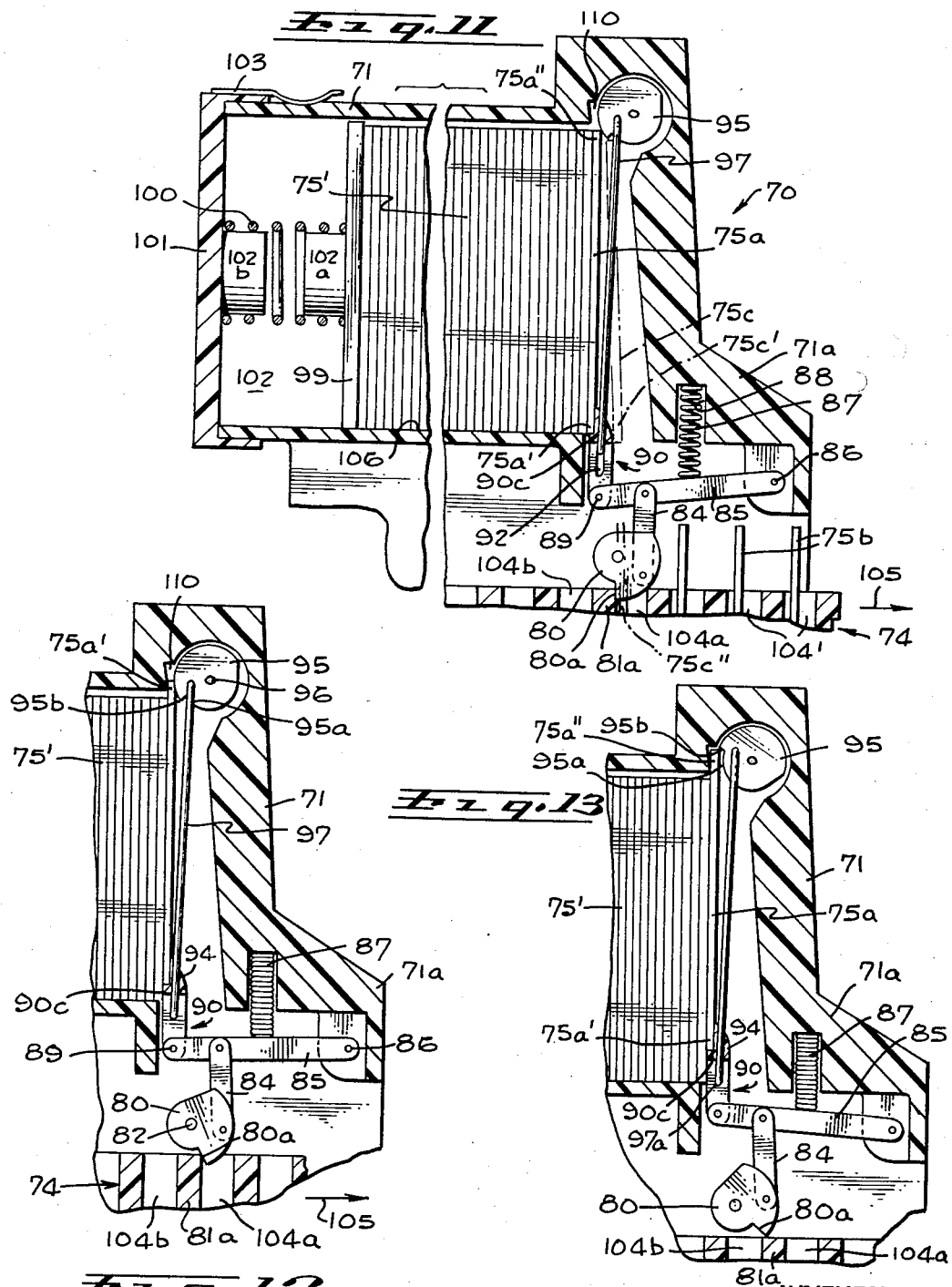

United States Patent Office 3,500,612
Patented Mar. 17, 1970

3,500,612
SLIDE TRAY LOADER
Justice Hall, Los Angeles, Calif.
(12732 Darla Ave., Granada Hills, Calif. 91344)
Filed Jan. 22, 1968, Ser. No. 699,425
Int. Cl. B65b 5/10, 39/00, 35/02
U.S. Cl. 53—246                                        13 Claims

ABSTRACT OF THE DISCLOSURE

A device for loading photographic slides into a slide tray for subsequent projection therefrom. The device comprises a housing adapted to receive a stack of slides to be loaded into a tray supported below the housing. As the tray is advanced through the loader, partitions in the tray engage a lever which actuates the loading mechanism. The stack of slides is retained by a separator lever which, under power of the actuator lever, displaces one slide into engagement with a substantially cylindrical release cam. Further motion of the slide tray causes the actuator lever to rotate the release cam thereby causing the displaced slide to drop into a slot in the tray.

BACKGROUND OF THE INVENTION

Field of the invention

The present invention relates to a slide tray loader and, more particularly, to a device for loading a stack of slides one at a time into slots of a slide tray under power provided solely by motion of the tray.

Description of the prior art

Many present day slide projectors utilize elongate or circular slide trays, typically fabricated of plastic and containing a plurality of partitions forming slots into which individual slides may be inserted. As the tray is advanced through the projector, the slides are inserted one at a time from the tray into the optical path of the projector and subsequently replaced into the slide tray. Such slide trays offer convenience both in the handling, presentation and storage of 35 millimeter and other photographic slides. However, the task of loading stacks of slides into individual slide tray slots is both tedious and time consuming. It is a particular annoyance when the trays must be loaded immediately preceding projection of the slides.

While various object dispensers are known in the prior art, none has been suggested for the loading of photographic slides into slide trays. Such prior art object dispensers typically were limited to the use of cam means for dealing playing cards one at a time from the bottom of a deck, or the use of a star wheel for feeding stacked drinking cups. Other devices have utilized microswitches to sense when an object has been dispensed, thereby causing a motor driven mechanism to release the subsequent object to be dispensed.

The present invention provides an apparatus for loading a stack of slides into successive slots in a slide tray, utilizing only power provided by movement of the slide tray itself. Thus, the invention provides a useful mechanism, not suggested by the prior art, for optimizing the convenience of photographic slide trays.

SUMMARY OF THE INVENTION

In accordance with the present invention, there is provided a device for loading photographic slides one at a time into successive slots of a slide tray. The device comprises a housing adapted to hold a stack of slides above the tray being loaded. As the slide tray is advanced below the housing, an actuator lever is engaged by the partition adjacent to the slot next to be loaded. The resultant motion of the actuator lever powers the slide insertion mechanism.

Within the housing, the slides to be loaded are restrained by a separator lever and a release cam. Motion imparted by the actuator lever causes the separator lever to displace one slide from the stack into engagement with a shoulder on the release cam. Subsequently, the release cam, also driven by the actuator lever, rotates to free the selected slide so that the slide can drop into the slot in the tray.

In a first embodiment, the slides are supported in a horizontal plane within the housing. The bottom slide, displaced by the separator into engagement with the release cam shoulder is subsequently supported between the release cam and a release lever. At an appropriate point in the loading cycle, the release lever is withdrawn under power provided by the actuator lever and the slide pivots about the release cam and slides down a chute into the slot.

In a second embodiment of the invention, the slides are supported in a vertical plane within the housing, and are spring biased against the release cam and the separator bar. The end slide in the stack is displaced upward toward the release cam by the separator lever. As the separator lever subsequently travels downward, the displaced slide is pushed over the top of the separator bar and is driven downward by the release cam past the separator bar into the slot.

Thus, it is an object of the present invention to provide a device for loading photographic slides into a slide tray.

It is another object of the present invention to provide an apparatus for loading slides from a stack into successive slots in a slide tray.

Another object of the present invention is to provide an automatic slide tray loader powered only by motion of the slide tray itself.

Yet another object of the present invention is to provide a slide tray loader wherein an actuator lever engaged by partitions in the slide tray provides power for a slide insertion mechanism.

A further object of the present invention is to provide a slide tray loader wherein a stack of slides is restrained between a release cam and a separator bar and where motion of the separator lever displaces the end slide into engagement with a shoulder of the release cam for subsequent discharge thereby.

It is yet a further object of the present invention to provide a slide tray loader wherein a scissor-like motion executed by a separator lever and a release lever accomplishes selection and release of a single slide into a tray.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIGURE 5 is a side sectional view of the insertion mechanism of the inventive slide tray loader at the beginning of the loading cycle, as seen generally along line 5—5 of FIGURE 2;

FIGURE 6 is a side sectional view, as seen generally along the line 5—5 of FIGURE 2 showing the slide insertion mechanism near completion of the loading cycle;

FIGURE 7 is a fragmentary sectional view of the slide tray loader actuator lever as seen generally along line 7—7 of FIGURE 5;

FIGURE 8 is an end elevation view, in partial section, of a second embodiment of the inventive slide tray loader. In this embodiment, also illustrated in FIGURES 9–13, the slides to be loaded are supported vertically prior to their release into the slide tray;

FIGURE 9 is a perspective view of the separator lever utilizer in the slide tray loader embodiment of FIGURE 8;

FIGURE 10 is a fragmentary top plan view, in partial section, of the embodiment of the slide tray loader shown in FIGURE 8, as seen generally along line 10—10 thereof;

FIGURE 11 is a side sectional view of the slide insertion mechanism of the inventive slide tray loader shown in FIGURE 8. The insertion mechanism is illustrated at the beginning of the slide loading cycle;

FIGURE 12 is a fragmentary side sectional view of the slide insertion mechanism also shown in FIGURE 11, the mechanism being illustrated approximately midway through the slide loading cycle; and FIGURE 13 is a fragmentary side sectional view of the slide insertion mechanism also shown in FIGURE 11, the mechanism being illustrated near completion of the slide loading cycle.

DESCRIPTION OF THE PREFERRED EMBODIMENTS

Figure 1:
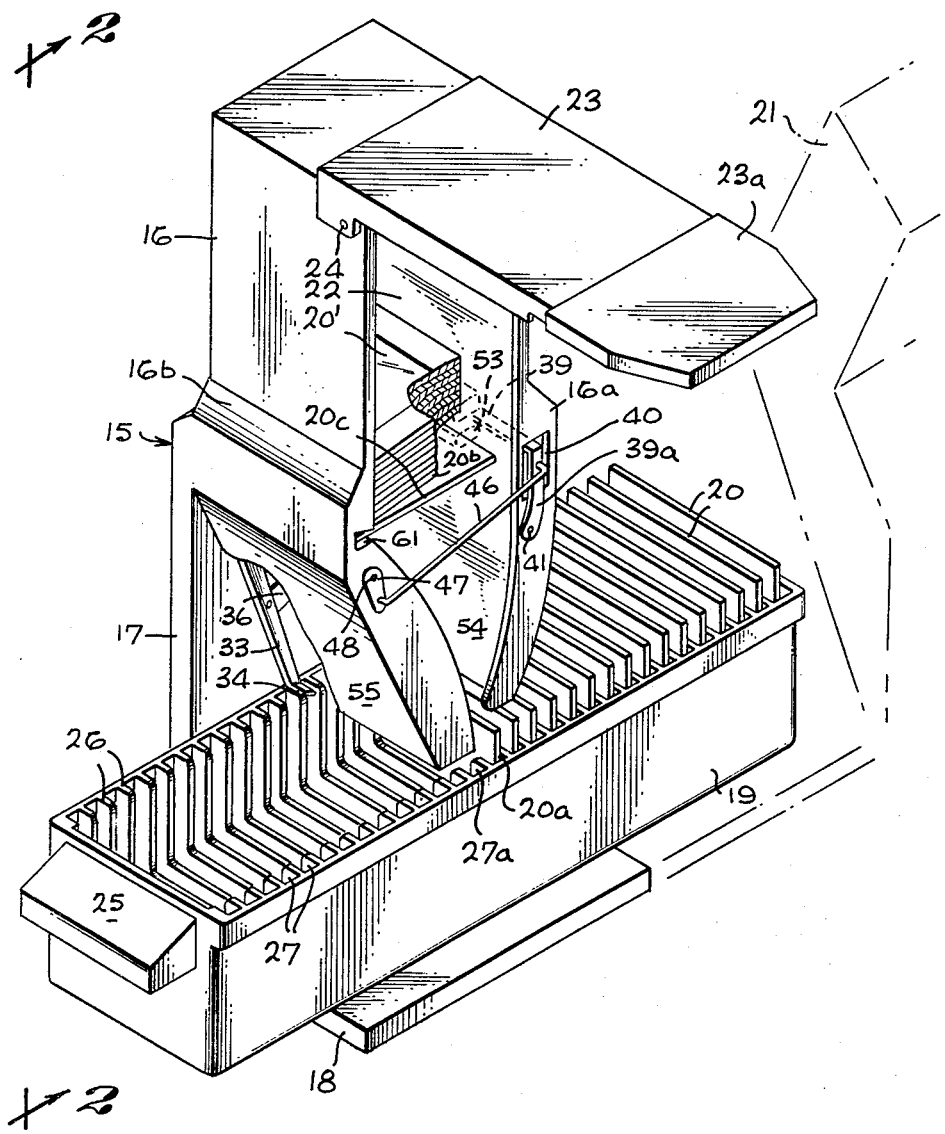
FIGURE 1 is a perspective view of one embodiment of the inventive slide tray loader, shown with the access cover raised to permit insertion of the stack of slides to be loaded. In this embodiment, also illustrated in FIGURES 2-7, the slides are supported horizontally prior to loading.
Figure 2:
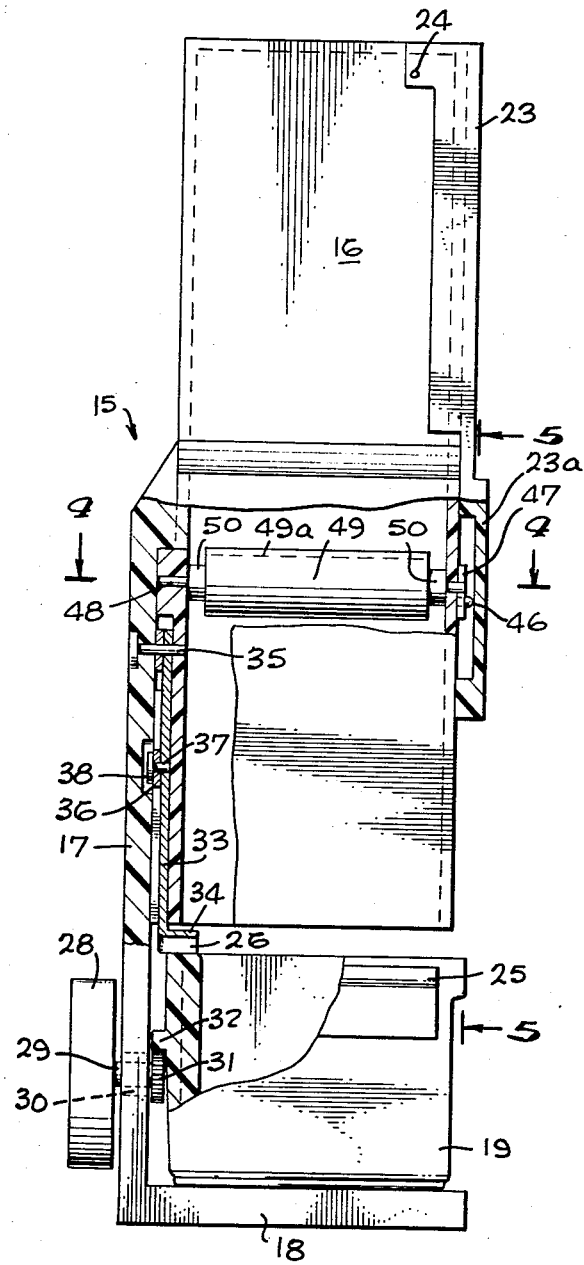
FIGURE 2 is an end elevation view, in partial section, of the slide tray loader illustrated in FIGURE 1.
Figure 3:
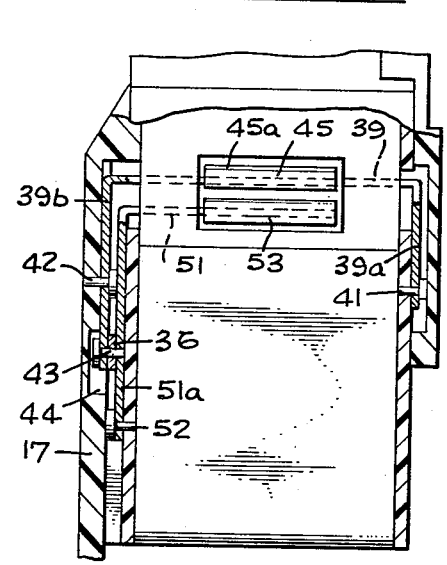
FIGURE 3 is a sectional view of the separator lever and release lever components of the inventive slide tray loader, as seen generally along line 3—3 of FIGURE 4.

A first embodiment of the inventive slide tray loader is illustrated in FIGURES 1–7. Referring now to these figures, and particularly to FIGURE 1, there may be seen a slide tray loader 15 comprising a housing 16, preferably fabricated of plastic. Housing 16 is supported by a vertical member 17 and a base 18, which base is sufficiently wide to support slide tray 19 to be loaded with slides 20. While tray 19 illustrated in FIGURE 1 is of the straight-line variety conventionally accepted by magazine-type slide projectors, inventive slide tray loader 15 also can be utilized to load trays of circular or other geometric shape.

Inventive slide tray loader 15 may be attached to a standard slide projector 21 (illustrated in phantom in FIGURE 1) so that slide tray 19 will be loaded during insertion into projector 21. Of course, slide tray loader 15 most commonly will be utilized independently of projector 21 to accomplish pre-loading of slide tray 19.

Referring still to FIGURE 1, note that housing 16 contains an interior compartment 22 within which is placed a stack 20′ of slides 20 to be loaded into tray 19. Housing 16 is provided with an access cover 23 connected to pivot with respect to housing 16 about an axis 24. Access cover 23 may be rotated about axis 24 to enclose compartment 22, thereby providing a relatively dust-free compartment for temporary or prolonged storage of slides 20.

Typical slide tray 19 includes a handle 25 and a plurality of partitions 26 defining slots 27 into which slides 20 may be inserted. Note that in the embodiment of the invention illustrated in FIGURES 1–7, the motion of slide tray 19 during the loading operation is rearward. Thus, slide 20a is the most recent slide inserted into tray 19 by slide tray loader 15.

Motion of slide tray 19 may be accomplished by an appropriate motor driven advance mechanism, well known to those skilled in the art. Alternatively, inventive slide tray loader 15 may include the apparatus, shown in FIGURE 2, wherein a slide tray advance knob 28 is attached to a shaft 29. Shaft 29 is in journal engagement with a bearing 30 through vertical support member 17 and terminates in a pinion 31. Pinion 31 engages the rack 32 of slide tray 19 so that rotation of knob 28 will effect advance of tray 19.

Slide tray loader 19 includes an actuator lever 33 having a tongue portion 34 adapted to engage partitions 26 during rearward motion of slide tray 19. Actuator lever 33 pivots about a shaft 35 extending through support member 17. Actuator lever 33 also is connected to a link 36 via a shaft 37 which is free to move within recess 38 of support member 17. As will be described in detail hereinbelow, the pivotal motion of actuator lever 33, caused by a slide tray partition 26 pushing against actuator lever tongue 34, results in controlled release of a single slide 20 into one of slots 26.

As best illustrated in FIGURES 1, 3, 5 and 6, enlarged section 16a of housing 16 contains a substantially U-shaped separator lever 39 which includes a first substantially downwardly extending portion 39a which extends through aperture 40 in housing section 16a and which is pivotally connected to a first shaft 41. Separator lever 39 also includes a second downwardly extending portion 39b pivotally connected to a corresponding second shaft 42. Shaft 42 is fixedly connected to vertical support member 17 and is disposed in opposite coaxial alignment with shaft 41, thereby permitting pivotal motion of separator lever 39 about an axis through shafts 41 and 42. Downwardly extending portion 39b also is pivotally attached to link 36 via a shaft 43, which shaft is free to move within a recess 44 of member 17. Attached to separator lever 39 is a separator bar 45 having a shoulder 45a defined by an edge 45b which preferably corresponds in height to the thickness of a typical slide 20.

Separator lever 39 is connected via a rod 46 to a crank 47 so that pivotal motion of lever 39 causes rotational motion of crank 47. Crank 47 is attached via a shaft 48 to a release cam 49 (see FIGURES 2 and 4) having a longitudinally extending shoulder 49a defined by an edge 49b. The height of edge 49a preferably corresponds to the thickness of a typical slide 20. Release cam 49 is adapted to engage one end of the next slide 20c to be loaded. Release cam 49 is centered within compartment 22 by a pair of spacers 50. Rotation of crank 47 causes corresponding rotational motion of release cam 49.

Housing access cover 23 includes recessed portion 23a (see FIGURES 1 and 2) which, when closed, encloses rod 46, crank 47 and the portion of lever 39 external of aperture 40.

Housing section 16a also contains a release lever 51 which supports an edge of the slide 20c next to be loaded. Release lever 51 is substantially L-shaped, having downwardly depending portion 51a adapted to pivot about a shaft 52. Release lever 51 also is pivotally connected to link 36 by shaft 43. The horizontal portion of release lever 51 terminates in a release bar 53 disposed generally beneath separator bar 45.

Figure 4:
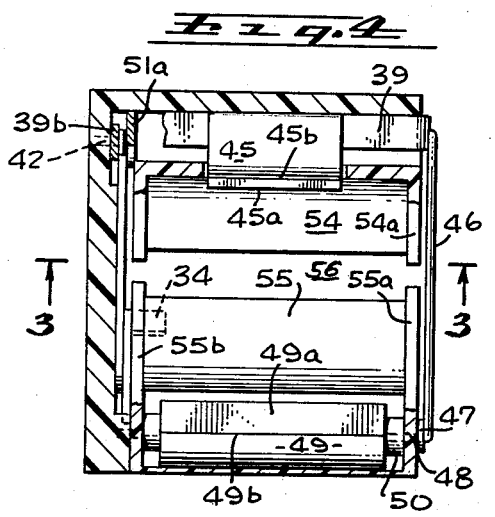
FIGURE 4 is a top sectional view of the inventive slide tray loader, as seen generally along line 4—4 of FIGURE 2.

As illustrated in FIGURES 1, 4, 5 and 6, the stack 20′ of slides to be loaded is supported within compartment 22 between shoulder 49a of release cam 49 and shoulder 45a of separator bar 45. As best seen in FIGURE 4, a top view looking downward from within compartment 22, a deflector 54 and a chute 55 define an opening 56 through which the bottom slide from stack 20′ is inserted into slide tray 19. Note that deflector 54 includes a pair of sides 54a and 54b which, together with a pair of guide walls 55a and 55b on chute 55, prevent rotation of the slide being inserted.

As most clearly illustrated in FIGURES 5, 6 and 7, actuator lever 33 generally is situated within a recess 57 in chute 55 and is spring-biased by a leaf spring 58 against a lower section 55′ of chute 55. The ends of leaf spring 58 seat within a recess 59 of actuator lever 33 and bowed center section of spring 58 is received by a recess 60 in chute 55.

The operation of inventive slide tray loader 15 is best described with reference to FIGURES 5 and 6. Referring initially to FIGURE 5, the slide insertion mechanism of slide tray loader 15 is generally illustrated at the start of the slide loading cycle. Actuator lever 33 is biased against lower section 55' of chute 55 by leaf spring 58, and partition 26a of rearwardly advancing slide tray 19 has just come into contact with tongue 34. Separator bar 45 rests against housing section 16a with the rear edge 45b of shoulder 45a flush with the wall of compartment 22. Release bar 53 extends within compartment 22, and release cam 49 is oriented with edge 49b of shoulder 49a flush with the rear of a recess 61 in housing section 16b.

At the start of the slide loading cycle (see FIGURE 5) slide 20c, which is next to be loaded into slot 27a of slide tray 19, is supported between shoulder 49a of release cam 49 and the top of release bar 53. Slide 20b which, during the subsequent loading cycle will be loaded into slot 27b of tray 19, is supported between shoulder 45a of release bar 45 and the top of slide 20c.

As slide tray 19 is advanced rearwardly of inventive slide tray loader 15 is in the direction of arrow 62, partition 26a pushes against actuator lever tongue 34, causing lever 33 to rotate counterclockwise about shaft 35.

As actuator lever 33 is rotated from the start loading cycle position illustrated in FIGURE 5 to the slide release position shown in FIGURE 6, link 36 moves generally rearwardly of loader 15 (i.e., toward the right in FIGURES 5 and 6). This rearward motion of link 36 causes release lever 51 to pivot clockwise about shaft 52, thereby removing release bar 53 from beneath slide 20c. Simultaneously the rearward motion of link 36 causes selector lever 39 to pivot counterclockwise about shafts 41 and 42. This pivotal motion of selector lever 39 drives rod 46 to the left (see FIGURES 5 and 6), thereby causing clockwise rotation of crank 47, shaft 48, and release cam 49.

As release bar 53 pivots out from beneath slide 20c, the simultaneous rotation of release cam 49 into the orientation shown in FIGURE 6, causes slide 20c to pivot about cam 49, through the angle indicated by arrow 63, to the position shown in phantom at 20c'. Slide 20c then drops off shoulder 49a, falls through the angle indicated by arrow 64, and slides down chute 55 between guide walls 55a and 55b. Slide 20c drops past the position shown in phantom at 20c' into slot 26a of tray 19.

Simultaneous with the release of slide 20c, the clockwise pivotal motion of separator lever 39 (from the position shown in FIGURE 5 to that shown in FIGURE 6) pushes slide 20b toward release cam 49. As shown in FIGURE 6, an edge of slide 20b seats within recess 61. Since the height of edge 45b of release bar 45 preferably corresponds to the thickness of a typical slide 20, only the bottom slide of stack 20' is selected for subsequent insertion into slide tray 19.

As slide tray 19 continues to move in the direction of arrow 62 (see FIGURE 6), tongue 34 slips off partition 26a and actuator lever 33 pivots clockwise under the biasing force of leaf spring 58 back to the start load cycle orientation shown in FIGURE 5. During this reset portion of the slide loading cycle, link 36 moves to the left (see FIGURES 5 and 6) causing separator lever 39 to pivot clockwise about shafts 41 and 42, and causing release lever 51 to pivot counterclockwise about shaft 52. As this occurs, edge 20b' of slide 20b drops off shoulder 45a onto release bar 53. The pivotal motion of separator lever 39 causes release cam 49 to rotate counterclockwise so that the edge of slide 20b" within recess 61 can drop onto shoulder 49a. Slide tray loader 15 then has completed a slide loading cycle, and has returned to the start loading cycle configuration shown in FIGURE 5.

An alternative embodiment of the inventive slide tray loader is illustrated in FIGURES 8–13. In this embodiment, as shown particularly in FIGURE 8, slide tray loader 70 is seen to comprise a housing 71 having vertical support members 72a and 72b and a base 73. Base 73 is sufficiently wide to accommoddate a slide tray 74 into which a vertically supported stack of slides 75 is to to be loaded. A slide tray advance knob 76 is connected via a shaft 77 to a pinion 78 which engages the rack 79 of tray 74. Thus, rotation of knob 76 advances slide tray 74 through loader 70.

The slide release mechanism of loader 70 includes identical members disposed in opposite parallelism adjacent respective support members 72a and 72b; for ease of exposition, only one set of members will be described hereinbelow. In particular, a pair of pawls 80 and 80' (evident in FIGURES 8 and 10, but most clearly shown in FIGURES 11–13) engage the partitions 81 of slide tray 74. Pawl 80 (similarly, pawl 80') is pivotally attached to vertical support members 72 via shaft 82 which is in journal engagement with an appropriate bearing 83. Pawl 80 is connected via link 84 to an actuator lever 85. Actuator lever 85 itself is adapted to pivot about an axis 86 by a coil spring 87 disposed within a hole 88 extending into an enlarged housing region 71a. In turn, actuator lever 85 is pivotally connected by a shaft 89 to selector lever 90.

As shown most clearly in FIGURE 9, substantially U-shaped separator lever 90 includes a pair of end members 91 depending at right angles from respective vertical sections 90a and 90b. End members 91 each include a slot 92 and a through hole 93. Preferably, the distance between sections 90a and 90b is greater than the width of a typical slide 75, and the thickness of horizontal section 90c corresponds to the thickness of a typical slide 75. Attached to one side of horizontal section 90c, approximately centered between sections 90a and 90b, is a semicylindrical member 94 having a curved surface 94a. Horizontal section 90c and member 94 together function as the separator bar for inventive slide tray loader 70. The upper edge of member 94 is situated above the upper edge of horizontal member 90c by a distance generally corresponding to the extent of vertical travel (as will be described hereinbelow) of separation lever 90.

A release cam 95, shown in FIGURES 8 and 11–13, is situated within housing 71 adjacent the top of the stack of slides 75. Release cam 95 includes shoulder 95a defined by edge 95b which has a height generally corresponding to the thickness of a typical slide 75. Release cam 95 is pivotally mounted via a shaft 96 and is driven off axis by rods 97, the lower ends 97a of which are slidingly seated in slots 92 of separator lever end members 91. Note in FIGURE 10 that bearing 83, end member 91 of separator lever 90 and rod 97 are all disposed within recess 98 of vertical member 72a.

Referring to FIGURE 11, note that within housing 71 each of slides 75 is disposed vertically to form stack 75' which is maintained in place by a pressure plate 99. Plate 99 is biased against stack 75' by a coil spring 100, which extends between plate 99 and a cover 101, spring 100 being supported by a pair of cylindrical members 102a and 102b attached respectively to plate 99 and cover 101. Cover 101 is adapted to press fit over an open end 102 of housing 71. Cover 101 is provided with a spring clip 103 for friction engagement with housing 71 to insure that cover 101 will not slip off under pressure of spring 100. Note that spring 100 effectively biases end slide 75a against release cam 95 and member 94 of separator lever 90.

The operation of inventive slide tray loader 70 is illustrated in FIGURES 11, 12 and 13 which show the slide insertion mechanism at three successive points in the slide loading cycle. Referring initially to FIGURE 11, which depicts the start of the slide loading cycle, note that pawl 80 is in its extreme clockwise position, with edge 80a disposed against the partition 81a separating the slot 104a from the slot 104b which is next to be loaded with slide 75a. Note that slide tray 74 is advancing in the direction indicated by arrow 105 and that slots 104' previously have been loaded with slides 75b. As will be described in detail hereinbelow, slide 75c is dropped into slot 104a concurrent with the start of the loading cycle for slide 75a into slot 104b.

Still referring to FIGURE 11, at the start of the loading cycle, actuator lever 85 is biased counterclockwise about shaft 86 by spring 87, insuring that separator lever 90 is in the position shown, with the top edge of horizontal member 90c flush with the bottom inner wall 106 of housing 71. Lower end 97a of rod 97 is situated adjacent the top of slot 92, and shoulder 95a and edge 95b of release cam 95 are oriented at the position illustrated. Slide 75a is supported between release cam 95 and the flat surface of semicylindrical member 94 of separator lever 90, with the lower edge of slide 75a resting on the edge of horizontal member 90c.

As slide tray 74 advances in the direction indicated by arrow 105, pawl 80 begins to rotate counterclockwise about shaft 82, being driven by the pressure of partition 81a against pawl edge 80a, as illustrated in FIGURE 12. As pawl 80 rotates counterclockwise, link 84 moves upward driving actuator lever 85 clockwise about shaft 86. Actuator lever 85, being pivotally connected to separator lever 90 by shaft 89, in turn causes separator lever 90 to move vertically. This vertical motion pushes slide 75a upward so that upper slide edge 75a' becomes partially situated within a recess 110 of housing 71 adjacent release cam 95.

At the point in the slide loading cycle illustrated in FIGURE 12, separator lever 90 has moved vertically by a distance substantially equal to the length of slot 92. Thus, end 97a of rod 97 now is situated at the lower end of slot 92; however, no motion has as yet been imparted to rod 97 by separator lever 90. As a result, release cam 95 is oriented with shoulder 95a in the same angular position as that illustrated in FIGURE 11 at the start of the slide loading cycle.

The slide loading cycle progresses as slide tray 74 advances in the direction indicated by arrow 105, further rotating pawl 80 counterclockwise about shaft 82. This additional rotation causes additional upward motion of link 84, actuator lever 85 and separator lever 90, thereby pushing upper edge 75a' of slide 75a further into recess 110. Moreover, this additional upward motion of separator lever 90 now pushes rod 97 upward, rotating release cam 95 clockwise about shaft 96. As illustrated in FIGURE 13, the upward motion of separator lever 90 and clockwise rotation of release cam 95 reach their limit as pawl edge 80a crosses the top of partition 81a of slide tray 74.

Referring still to FIGURE 13, note that upper edge 75a' of slide 75a is disposed most of the way into recess 110, slide 75a being supported by the upper edge of member 90c of separator lever 90. Note also that edge 95b of cam shoulder 95a is situated slightly above upper edge 75a'' of slide 75a.

With further advance of slide tray 74 in the direction of arrow 105, edge 80a of pawl 80 slides over partition 81a and drops into the next slot 104b. As this occurs, the resultant clockwise rotation of pawl 80 about shaft 82 pulls link 84, actuator lever 85 and separator lever 90 downward toward the start load cycle position shown in FIGURE 11. When separator lever 90 moves downward sufficiently far so that the top of semi-cylindrical member 94 is lower than the bottom edge 75a'' of slide 75a, slide 75a will be pushed past separator lever 90 by the action of bias spring 100. During this initial downward motion of separator lever 90, no rotation of release cam 95 occurs, since the top of slot 92 has not dropped sufficiently to engage lower end 97a of rod 97.

The continued downward motion of separator lever 90 causes rod 97 to be driven downward, rotating release cam 95 counterclockwise. Edge 95b of release cam 95 engages edge 75a' of slide 75a, pushing slide 75a downward. Lower edge 75a'' of slide 75a is guided around curved surface 94a of separator lever 90, and slide 75a drops into slot 104b of slide tray 74 to complete the slide loading cycle.

Illustrated in phantom in FIGURE 11 is the final release of slide 75c into slot 104a of slide tray 74. It will be understood that the loading cycle for slide 75c is completed at substantially the same time as the start of the loading cycle for slide 75a. Thus, edge 75c' is guided around surface 97a of separator lever 90, and slide 75c drops into slot 104a (as shown in phantom at 75c'' in FIGURE 12 just as a pawl 80 reaches the start of the loading cycle (for slide 75a) illustrated in FIGURE 12.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A device for loading slides into a slide tray of the type including partitions defining slide-receiving slots, said device comprising:
    a housing adapted to receive a stack of slides;
    means for supporting and for advancing said slide tray beneath said housing;
    actuator means depending from said housing to engage successively said partitions whereby advance of said slide tray imparts motion to said actuator means;
    a substantially cylindrical release cam disposed within said housing, said release cam operatively connected to said actuator means; and
    separator means operatively connected to said actuator means for displacing the end slide in said stack toward said release cam in response to motion of said actuator means whereby subsequent rotation of said release cam causes said displaced slide to drop into one of said slots.

2. The device defined in claim 1 wherein
    said actuator means comprises an actuator lever; and wherein
    said separator means comprises a separator bar linked to said actuator lever, said separator bar having a shoulder disposed within said housing to receive one edge of said end slide, an edge of said shoulder being no thicker than said slide.

3. The device defined in claim 2 wherein
    motion of said actuator lever causes movement of said separator bar in a plane substantially parallel to said end slide thereby displacing said end slide toward said release cam.

4. The device defined in claim 3 wherein
    said housing is recessed adjacent said release cam, said end slide being displaced into said recess.

5. The device defined by claim 3 further comprising:
    a rod connecting said release cam with said separator bar whereby movement of said separator bar imparts rotation to said cam via said rod.

6. The device defined in claim 5 wherein one end of said actuator lever engages said partitions.

7. The device defined in claim 6, said device further comprising:
    a release lever disposed within said housing, said release lever and said separator bar together adapted for scissor-like movement powered by said actuator lever, said release lever receiving said one edge of said end slide subsequent to said displacement of said end slide.

8. The device defined in claim 5 wherein said actuator means further comprises:
    a pawl adapted for rotational motion about a shaft attached to said housing, said pawl engaging said partitions; and wherein said actuator lever is linked to said pawl.

9. The device defined in claim 8 wherein one end of said rod seats within a slot in said separator bar whereby said release cam is driven rotationally during a portion only of the movement of said separator bar.

10. A device for loading slides into a slide tray of the type including partitions defining therebetween slide-receiving slots, said device comprising:

a housing adapted to receive a stack of horizontally disposed slides;

means for supporting and advancing said slide tray beneath said housing;

an actuator lever depending from said housing, the lower end of said lever engaging successively said partitions whereby advance of said tray causes said lever to pivot back and forth as said partitions are engaged;

a separator lever disposed within said housing and adapted to pivot about a first horizontal axis, said lever including a separator bar having a shoulder aligned to support a first edge of said stack;

a release lever disposed within said housing and adapted to pivot about a second horizontal axis lower than said first horizontal axis;

a link, one end of said link being pivotally connected to said actuator lever, the other end of said link being pivotally connected to both said separator lever and said release lever between said first and said second horizontal axes, whereby back and forth motion of said actuator lever causes scissor-like motion of said separator and release levers;

a substantially cylindrical release cam disposed within said housing and adapted to support the edge of said stack opposite said first edge; and rod and crank means connecting said separator lever and said release cam whereby pivotal motion of said separator lever about said first horizontal axis causes rotational motion of said release cam about a horizontal axis.

11. The device defined in claim 10 wherein said separator bar shoulder includes an edge having a thickness no greater than said slide whereby motion of said separator bar toward said release cam displaces the end slide on said stack toward said release cam, said first edge of said end slide dropping onto said release lever as said separator bar moves away from said release cam.

12. The device defined in claim 11 wherein said release cam includes a shoulder, said release cam shoulder receiving said displaced slide whereby subsequent motion of said release lever away from said release cam and the concurrent rotation of said release cam cause said slide to drop onto said slot.

13. A device for loading slides into a slide tray of the type including partitions defining slide-receiving slots, said device comprising:

a housing adapted to receive a stack of vertically disposed slides;

means for supporting and advancing said slide tray beneath said housing;

a pawl adapted for rotational motion about a shaft attached to said housing, said pawl engaging said partitions;

a spring biased actuator lever linked to said pawl;

a separator bar within said housing and adapted to be moved vertically by said actuator lever, said separator bar including a shoulder restraining the lower edge of the end slide of said stack, and an edge having a thickness no greater than said slide;

a release cam disposed within said housing above said separator bar;

a rod connected between said release cam and a vertical slot in said separator bar whereby said release cam is driven rotationally via said rod during a portion only of the vertical travel of said separator bar whereby upward motion of said separator bar displaces said end slide upwardly into engagement with said release cam and whereby subsequent downward motion of said separator bar causes said release cam to drive said displaced slide downward past said separator bar into said slot.

References Cited

UNITED STATES PATENTS

| 2,942,392 | 6/1960 | McCain et al. | 53—246 |
| 3,007,296 | 11/1961 | Johnson et al. | 53—246 |

BERNARD STICKNEY, Primary Examiner

R. L. SPRUILL, Assistant Examiner